United States Patent [19]

Friedrich

[11] Patent Number: 5,660,079

[45] Date of Patent: Aug. 26, 1997

[54] MOTOR VEHICLE TRANSMISSION WITH A SYSTEM FOR THE DETECTION OF THE SHIFT POSITION SELECTED IN THE MOTOR VEHICLE TRANSMISSION

[75] Inventor: Erich Friedrich, Ettleben, Germany

[73] Assignee: Fichtel & Sachs AG, Schweinfurt, Germany

[21] Appl. No.: 510,108

[22] Filed: Aug. 1, 1995

[30] Foreign Application Priority Data

Aug. 2, 1994 [DE] Germany .................. 44 27 330.4

[51] Int. Cl.⁶ .................................................. F16H 59/04
[52] U.S. Cl. ................... 74/471; 74/335; 200/61.88
[58] Field of Search ................ 74/335, 471; 200/61.88

[56] References Cited

U.S. PATENT DOCUMENTS

| | | | |
|---|---|---|---|
| 4,519,266 | 5/1985 | Reinecke | 200/61.88 |
| 4,856,360 | 8/1989 | Yoshimura et al. | 74/335 |
| 5,029,683 | 7/1991 | Grunberg et al. | 192/3.55 |
| 5,038,901 | 8/1991 | Parsons et al. | 192/3.55 |
| 5,179,867 | 1/1993 | Sakakibara et al. | 74/335 |

FOREIGN PATENT DOCUMENTS

| | | |
|---|---|---|
| 3836145 | 4/1990 | Germany . |
| 4208888 | 9/1993 | Germany . |
| 4237669 | 5/1994 | Germany . |
| 2240372 | 7/1991 | United Kingdom . |
| 9004122 | 4/1990 | WIPO . |

*Primary Examiner*—Charles A. Marmor
*Assistant Examiner*—Sherry Lynn Estremsky
*Attorney, Agent, or Firm*—Nils H. Ljungman and Associates

[57] ABSTRACT

To detect the shift position of a motor vehicle transmission (1), the invention teaches that by means of sensors (17), the position of a shift lever (7) which shifts the transmission (1) is measured in the neutral path of a shift pattern of the transmission which corresponds to the neutral position of the transmission (1). The direction of the displacement into the gears which are located in pairs in the shift paths of the transmission is measured by means of shift lever contacts (23), which respond when the shift lever (7) is displaced from the neutral shift position. An evaluation circuit (25), as a function of the signals from the sensors (17) which, in the neutral shift position of the transmission, detect the shift path which has been selected and the signals from the shift lever contacts (23) which detect the direction of displacement, delivers a shift position signal which identifies the shift position instantaneously engaged. The speed ratio of the input shaft (3) and the output shaft (5) of the transmission (1) determined by means of speed sensors (33, 35) is compared in the evaluation circuit (25) to the transmission ratio specified by the design of the transmission for the shift position selected. When the speed ratios coincide, the gear is assumed to be engaged. Since in the transmission (1), only the shift position of the shift lever (7) in the neutral shift position is monitored, the sensors or switches (17) used for this purpose can have large actuation range tolerances.

8 Claims, 4 Drawing Sheets

MOTOR VEHICLE TRANSMISSION WITH A SYSTEM FOR THE DETECTION OF THE SHIFT POSITION SELECTED IN THE MOTOR VEHICLE TRANSMISSION

BACKGROUND OF THE INVENTION

1. Field of the Invention:

The present invention generally relates to a system for the detection of the shift position selected in a motor vehicle transmission.

2. Background Information:

For a number of applications, e.g. in an automatic friction clutch in the drive train of a motor vehicle, or damping force control systems on the chassis of a motor vehicle, a knowledge of the instantaneous gear or shift position which has been selected in a multispeed transmission is necessary to achieve the most comfortable ride possible, or to perform control procedures which may be necessary for vehicle safety. In particular, not only is it desirable to detect the intention to shift gears as early as possible, i.e. to identify the shift position of the transmission, but the system should also be capable of detecting, as early as possible, which gear is being shifted into.

DE-A-38 36 145 discloses a method which employs a flat potentiometer, the movable wiper of which can be moved over a flat resistance in two coordinate directions and is coupled to a manually actuated shift lever of the transmission, which makes it possible to detect the instantaneous position to which the transmission is being shifted. An evaluation circuit measures the resistance ratios determined by the shift position of the transmission in the two coordinate directions, and assigns the measured resistance ratios to value ranges which are specified for the individual shift positions. The value ranges are defined in a learning process on the basis of the current design, which of course makes the calibration of the system easier, but requires relatively expensive circuitry. The flat potentiometer is also relatively complex and expensive, and is susceptible to malfunctions.

DE-A-42 08 888 discloses a system for the detection of the shift position of a motor vehicle transmission by means of a switch module which is attached to the housing of the transmission. The switch module contains a number of magnetic field sensors which respond to magnets, which magnets are located on the sliding selector shafts of the transmission. The selector shafts change the pairs of gear wheels. The magnetic field sensors are arranged so that they respond to the magnets in the limit positions of the sliding selector shafts. From the combination of magnetic field sensors actuated, an evaluation circuit can then be used to identify the instantaneous shifting position selected in the transmission. In addition to the fact that a comparatively large number of such magnetic field sensors are required in a conventional multispeed transmission of a motor vehicle, the calibration of the magnetic field sensors can present problems.

In particular, in automatic friction clutches of motor vehicles, the clutch control should be informed of the intention to shift gears. The transmission can be shifted by means of motorized actuators, in which case the signals indicating an upcoming change of gear are supplied by the transmission control system. For transmissions which are shifted manually, there are known devices which include a switch in the shifting mechanism, which, in this case, is represented by a shift lever. The displacement of the shift lever which initiates the shifting of the transmission actuates this switch. Such a shift lever sensor is disclosed in DE-A-42 37 669, for example. This shift lever sensor is integrated into the handle of the shift lever, and comprises two switch contacts. These switch contacts can make it possible to identify the direction of movement of the shift lever.

OBJECT OF THE INVENTION

The object of the present invention is to create a system for the detection of the shift position selected in a motor vehicle transmission, which system can be realized at a relatively low cost, with relatively few parts, and can be essentially insensitive to calibration tolerances.

SUMMARY OF THE INVENTION

The present invention is based on a system for the detection of the shift position, which system has been set in a motor vehicle transmission. The system for the detection of the shift position can be designed for a transmission, which transmission can be shifted by an actuator mechanism. In particular, the transmission can be shifted by a manually activated shift lever into a neutral shift position or gear, in which position an output shaft of the transmission can be uncoupled from its input shaft. Starting from the neutral shift position, the manually activated shift lever can be shifted in several shift paths into one of several driving shift positions, in which the output shaft is essentially coupled to the input shaft at the transmission ratios corresponding to the individual driving shift positions.

The present invention advantageously includes the following features:

a sensor system which, when the transmission is set to the neutral shift position, can supply a path signal, which path signal can identify the shift path in which the actuator has been placed, a displacement indicator common to all the shift paths, which displacement indicator can supply a displacement signal whereby the displacement signal can identify a shift movement of the shift mechanism out of the neutral shift position, and an evaluation element which, independently of the path signal and the displacement signal, can supply a shift signal, which shift signal can identify the instantaneous shift position.

In contrast to known systems for the determination of the shift position, the sensor system of the present invention essentially does not detect the final state of the shifting motion of the transmission. Accordingly, while the transmission is in its neutral shift position, the sensor system of the present invention can identify the shift path to which the shifting mechanism has essentially been set, thereby essentially sensing which gear or driving shift position is to be subsequently selected. The displacement signaling switch, by the displacement signal, can indicate that the actuator mechanism of the transmission is moving out of the neutral shift position into the shift position corresponding to the shift path. The evaluation element can combine the path signal supplied by the sensor system and the displacement signal supplied by the displacement signaling switch with the position signal, which position signal can indicate the shift position, i.e. the signal which can identify the gear which has been selected. Since, in the neutral shift position, the signaling elements essentially need only designate the shift path to which the transmission is being set, these signaling elements can have relatively large tolerances. The tolerances can preferably be so large that the detection ranges for the individual shift paths can overlap, as long as the transmission is in the neutral shift position. It can be essentially ensured, at least under such conditions as discussed above, that the shift ranges of the sensor system corresponding to the individual shift paths are separated, when the actuator mechanism is essentially introduced into the shift paths, which shift paths are preferably separated from one another. The sensor system appropriately can include separate switches corresponding to the shift paths, in particular, contactless switches. Such contactless switches can be installed relatively easily due to the uncritical tolerance requirements as mentioned above, and possibly without calibration.

At least one of the shift paths or, as is conventional in "H" shift patterns of known related devices, several of the shift paths can correspond to two driving shift positions. The two driving shift positions can be selected starting from the neutral shift position by essentially moving the actuator mechanism in opposite shift directions. In this case, the displacement signaling switch can supply displacement signals, which displacement signals can thereby indicate the direction of the shifting motion toward the shift path. The evaluation element can then supply the position signal, which position signal can then identify the shift position as a function of the direction of motion indicated by the displacement signal. In automatic transmissions, the control element can be designed as an actuator, in which case the displacement signals can preferably be supplied by the transmission control system which controls the actuator. In manually shifted transmissions, the displacement signaling switch can comprise at least one switch, but, in particular, a pair of switches, which switch or switches can essentially respond to the actuation forces exerted on the shift lever, which shift lever is preferably designed for the manual initiation of a shifting motion.

A knowledge of the instantaneous gear or shift position may be necessary for the purpose of controlling the damping force of a motor vehicle or for the purpose of performing control procedures of the motor vehicle. When the shift lever, for example, is being moved into a gear, there can be signals indicating such a shift. Such signals can then be entered into an evaluation circuit. The evaluation circuit can thereby appropriately adjust the suspension system by setting the suspension system for either a softer or a harder damping force. Accordingly, such signals can be entered into the evaluation circuit also for the purpose of adjusting the automatic friction clutch, to perform control procedures.

In an automatic friction clutch, the shifting process of the transmission should essentially be completed before the clutch control system engages the friction clutch. This can normally be essentially guaranteed by allowing a certain delay between the initiation of the gear shifting process and the beginning of the clutch engagement process. On manually shifted transmissions, however, unintentional delays can occur under some circumstances, and such delays can cause the clutch control system to begin the clutch engagement process essentially before the transmission has been completely shifted to the desired shift position. Even though clutch control systems of such known devices are generally designed so that the driver can deliberately disengage the friction clutch by the accelerator pedal or the shift lever, it is nevertheless highly desirable to employ design measures which may prevent such operating conditions with somewhat greater certainty.

In one preferred embodiment, the present invention teaches that the evaluation element can supply the position signal, which position signal can identify the driving shift position together with information indicating that the shift position identified by the position signal has been essentially completely reached. This information can be identical to the position signal, e.g. the position signal can preferably be delivered to an output of the evaluation element essentially only if the driving shift position has been completely reached. Alternatively, the information can also be made available by a separate information signal. In contrast to known related systems for the recognition, detection, or identification of the shift position, however, the information is not derived from the shift position monitoring system of the transmission. The sensor system of the present invention preferably derives the information from the signals emitted by sensors or similar devices which are preferably part of the clutch control system, and which sensors or similar devices can, directly or indirectly, indicate that the desired shift position has been essentially completely reached.

For example, such information can be derived from the displacement of an accelerator pedal from its idle position by the driver. For this purpose, the evaluation element can preferably respond to an accelerator pedal sensor, which accelerator pedal sensor can detect the displacement of the accelerator pedal from the rest or idle position. The accelerator pedal sensor can then supply the information identifying the complete setting of the driving shift position when the accelerator pedal sensor essentially detects a displacement of the accelerator pedal from the idle position. Such a situation can occur, in particular, during the starting of a motor vehicle, when the clutch control system essentially keeps the friction clutch disengaged as long as the vehicle is stationary, and when the clutch control system initiates the clutch engagement process only with the actuation of the accelerator pedal. During starting, the driver essentially has the option of delaying or interrupting the clutch engagement process by taking his foot off the accelerator pedal. If necessary, the evaluation element can respond to a vehicle speed sensor, which vehicle speed sensor can preferably sense the speed of the vehicle. The vehicle speed sensor can, for example, be a speed sensor which essentially measures the speed of rotation of the transmission output shaft, so that the system can essentially guarantee that the information indicating the complete setting of the driving shift position is preferably supplied as a function of the accelerator pedal position, essentially only if the motor vehicle is stationary.

For shifting gears while driving, the information which indicates the completed selection of the driving shift position can be essentially clearly determined, preferably from the ratio of the speeds of the input shaft and the output shaft of the transmission. In one preferred embodiment, the present invention teaches that the evaluation element can respond to a first speed sensor, which first speed sensor can measure the speed of rotation of the output shaft of the transmission, and to a second speed sensor, which second speed sensor can measure the speed of rotation of the input shaft of the transmission. The evaluation element can therefore supply information indicating the complete setting or engagement of the driving shift position when the ratio of the speeds of the input shaft and the output shaft is essentially equal to the transmission ratio of the driving shift position indicated by the position signal. This embodiment takes advantage of the fact that the output shaft of the transmission generally rotates at a speed which is determined by the speed at which the vehicle is travelling, even when the friction clutch is disengaged. When the driving shift position has been essentially completely engaged, the input shaft of the transmission accordingly rotates at a speed of rotation which is essentially determined by the transmission ratio which corresponds to this shift position. From the measured speeds or from the ratio of these speeds to one another, a comparison can be made with the transmission ratio specified for that shift position, to determine that the shift position has been completely reached, and that the gear has therefore been engaged.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a transmission system for a motor vehicle having a shift lever arrangement with a system for the detection of a shift position selected in the motor vehicle transmission, the transmission comprising means for setting the transmission; the shift lever mechanism comprising a manually actuated shift lever; the shift lever mechanism further comprising an actuator mechanism; the shift lever mechanism for being set in a neutral position in which an output shaft of the transmission is uncoupled from its input shaft; the shift lever mechanism, starting from the neutral shift position, for being set in several shift paths to one of several driving shift positions, in which the output shaft is coupled to the input shaft at individual transmission ratios which correspond to the driving shift positions; a sensor system; comprising means for providing a path signal; the apparatus for providing a path signal, when the transmission is set to the neutral shift position, delivers a path signal which identifies the shift path to which the actuator mechanism is set; the apparatus for providing a path signal further comprising an apparatus for signaling a displacement; the apparatus for signaling a displacement; the apparatus for signaling a displacement being common to all the shift paths; each of the shift paths for supplying a displacement signal; the displacement signal identifying a shifting motion of the actuator mechanism out of the neutral shift position; the apparatus for providing a path signal further comprising an evaluation device; the evaluation device for supplying a position signal identifying the shift position as a function of the path signal and the displacement signal.

BRIEF DESCRIPTION OF THE DRAWINGS

The present invention is explained in greater detail below with reference to the embodiment illustrated in the accompanying drawings, in which.

DESCRIPTION OF THE PREFERRED EMBODIMENT

Figure 1:
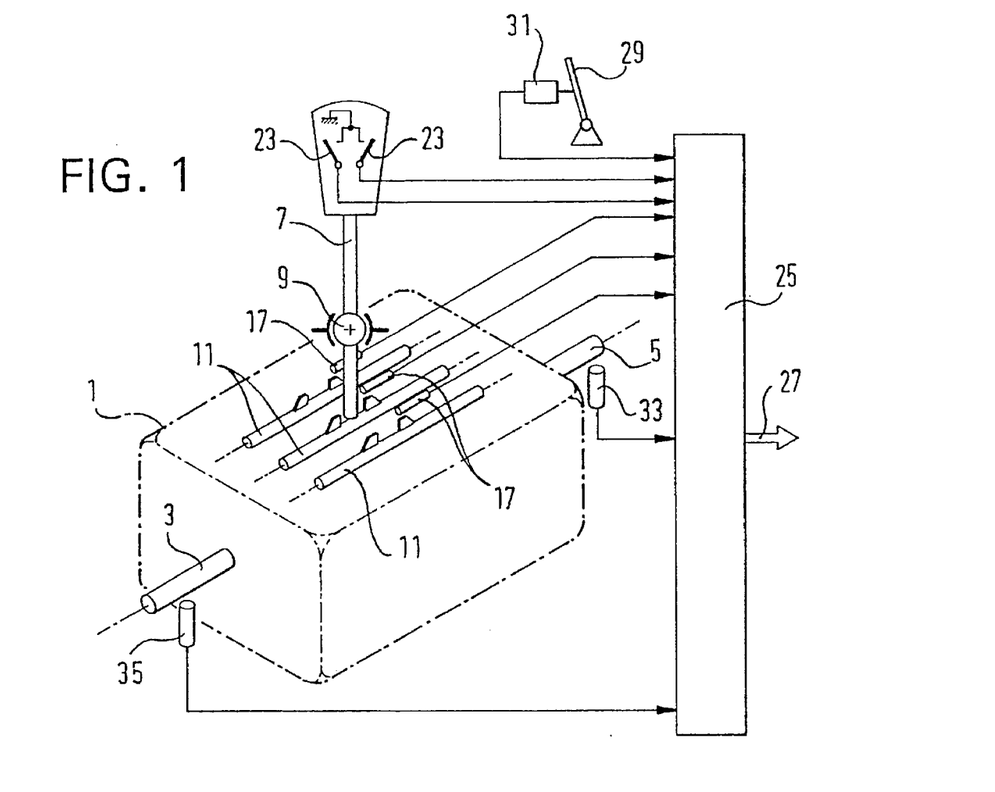
FIG. 1 shows a schematic illustration of a transmission component which must be shifted manually in a motor vehicle, the transmission component having a system for the detection of the shift position of the transmission.
Figure 2A:
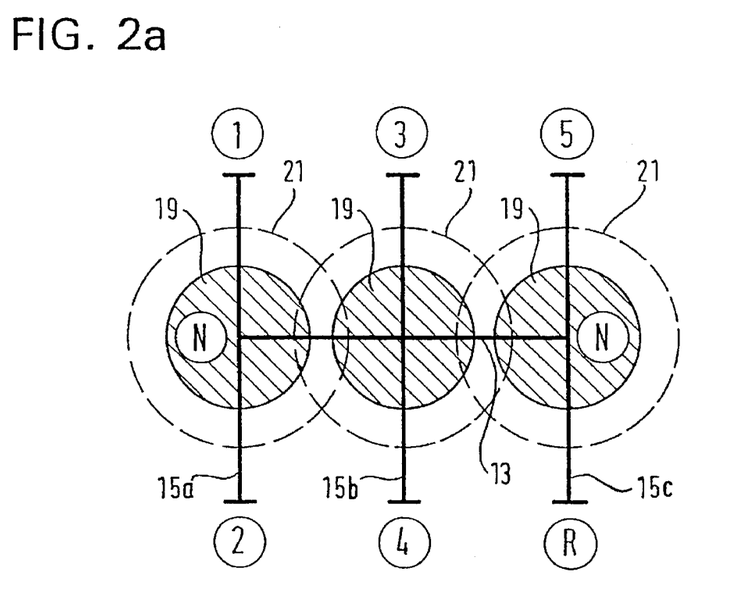
FIG. 2a shows the same view as in FIG. 2, but with added components.
Figure 3:
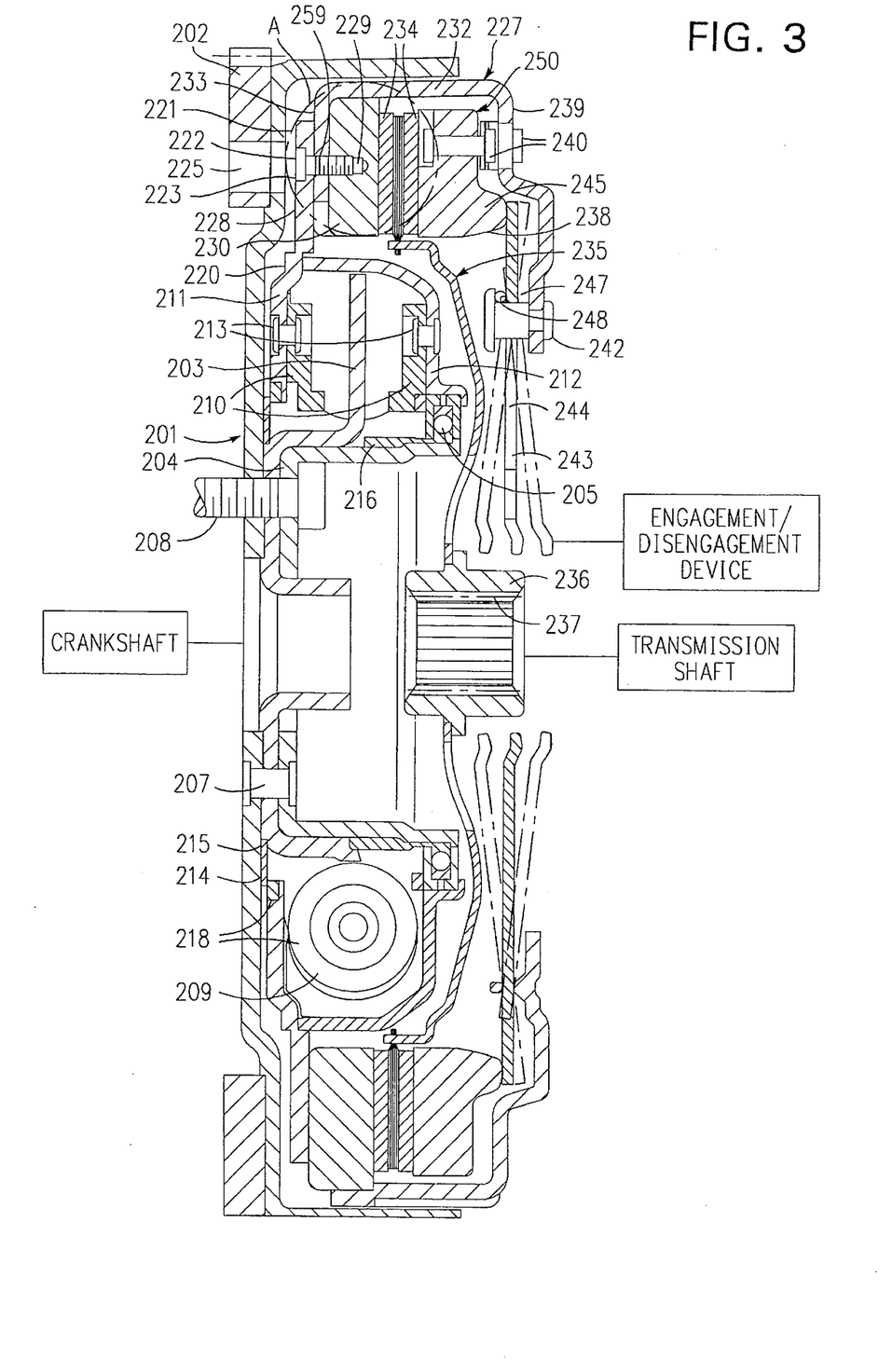
FIG. 3 shows a longitudinal section of a friction clutch assembly and related components.

FIG. 1 is a schematic illustration of a transmission 1 of a motor vehicle. The transmission 1 preferably comprises an input shaft 3, which input shaft 3 can preferably be coupled by a friction clutch (as shown in FIG. 3), in particular, an automatically actuated friction clutch, to the internal combustion engine (see FIG. 4) of the motor vehicle. The transmission 1 can preferably also include an output shaft 5. The output shaft 5 can be non-rotationally connected to the driving wheels of the motor vehicle in a manner which is well known and will therefore not be discussed herein in any further detail. The transmission 1 can be shifted by a manually actuated shift lever 7, as shown in FIG. 1. As illustrated in the diagram of the shift paths 15a, 15b, and 15c in FIG. 2a, the shift lever 7 can be shifted into a neutral shift position N, and starting from the neutral shift position N, the shift lever 7 can be shifted into several driving shift positions 1 to 5 and R. In the neutral shift position N, the output shaft 5 is essentially uncoupled from the input shaft 3, and therefore, as such, the input shaft 3 can rotate freely relative to the output shaft 5. In the driving shift positions, the output shaft 5 can essentially be non-rotationally connected to the input shaft 3, whereby the transmission stages corresponding to these driving shift positions can preferably define various specified transmission ratios of the speed of rotation of the input shaft 3 to the speed of rotation of the output shaft 5. In this context, however, a transmission ratio should not be understood to mean only an increase of the speed of rotation of the output shaft 5 in relation to the speed of rotation of the input shaft 3, but also a reduction of the speed of rotation of the output shaft 5 in relation to the speed of rotation of the input shaft 3.

Figure 2:
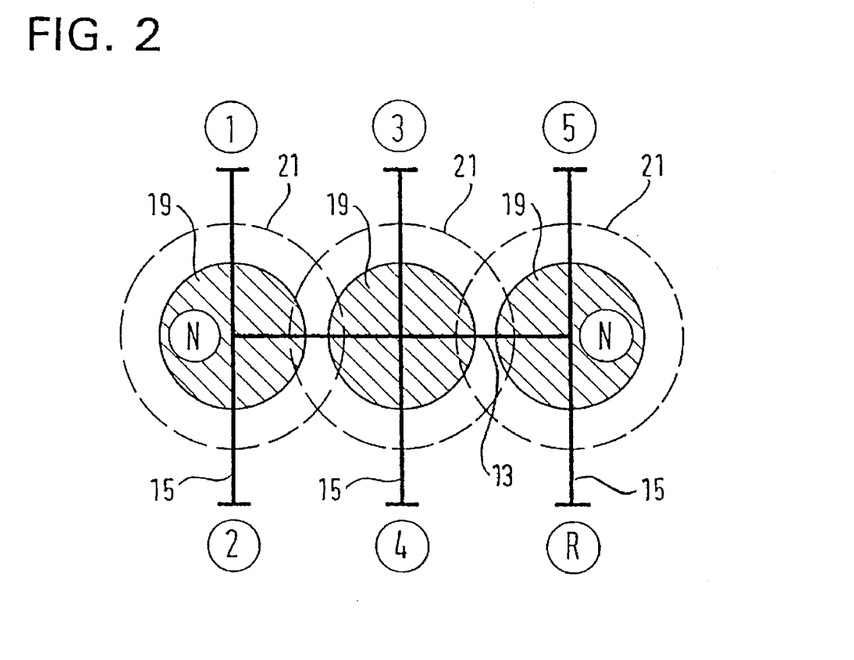
FIG. 2 shows a shift diagram of the transmission component illustrated in FIG. 1.

Moreover, the number and arrangement of the driving shift positions in the shift pattern diagram can differ from the pattern as indicated in FIG. 2. The transmission 1 can have, for example, more or fewer than five forward speeds 1 to 5, and the reverse gear R can be located at another point of the shift pattern.

Figure 1A:
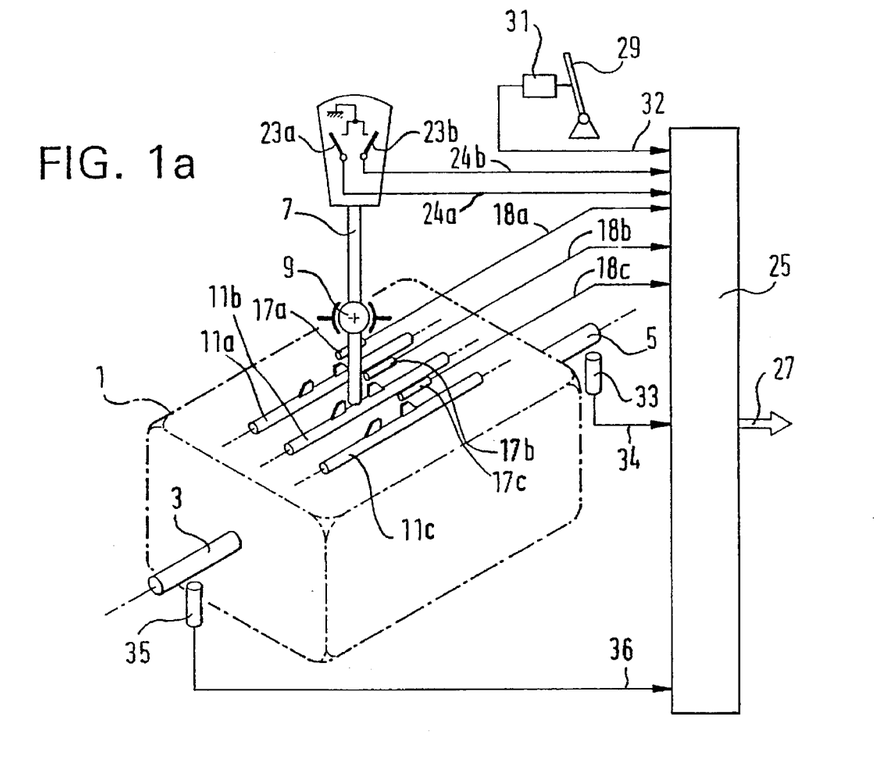
FIG. 1a shows the same view as in FIG. 1, but with added components.

It should also be understood that the shift lever 7, which shift lever 7, as shown in FIG. 1, is mounted in an articulated and stationary manner at 9, can be coupled in alternation, as shown in the shift pattern diagram in FIG. 2, with three sliding selector shafts 11a, 11b, and 11c, as shown in FIG. 1a, located axially parallel next to one another. In addition, when the shift lever 7 is essentially displaced along the shift paths 15a, 15b, and 15c, as shown in FIG. 2a, of the driving shift positions, the shift lever 7 can displace the sliding selector shafts 11a, 11b, and 11c to shift from one transmission gear to another. It should be further understood that the design and actuation of the transmission 1 can also differ from the illustrated embodiments, which embodiments may be referred to only by way of example.

As shown in the shift pattern diagram illustrated in FIG. 2a, the shift lever 7 in a neutral path 13 can be shifted into several shift paths 15a, 15b, and 15c which can extend at essentially right angles with respect to the neutral path 13. The shift paths 15a, 15b, and 15c can also correspond in pairs to the driving shift positions and each of the two driving gear positions corresponding to the particular shift path 15a, 15b, or 15c can be reached as a function of the direction of displacement by which the shift lever 7 is moved away from the neutral path 13. For example, on the basis of the conventional H-shaped shift pattern illustrated in FIGS. 2 and 2a, first gear (1) can be located in the left-hand shift path 15a, and can essentially be reached by a displacement of the shift lever 7 in the forward direction, while second gear (2) can be reached by moving the shift lever 7 in the reverse direction. As shown in FIGS. 2 and 2a, third gear (3) and fourth gear (4) are available in the center shift path 15b, while fifth gear (5) and reverse (R) can be reached in the right-hand shift path 15c.

The shift position currently selected in the transmission 1 can preferably be identified essentially on the basis of the shift status signals received from switches 17a, 17b, and 17c, as shown in FIG. 1a. The switches 17a, 17b, and 17c are preferably designed to monitor the position of the shift lever 7 in the neutral path 13. The switches 17a, 17b, and 17c which are preferably switches which operate in a contactless manner,(e.g. switches which are preferably sensitive to a magnetic field) can be actuated essentially as soon as the shift lever 7 in the neutral path 13 is essentially placed at least approximately in one of the shift paths 15a, 15b, or 15c.

As shown in FIGS. 2 and 2a, the cross-hatched circular areas indicate the actuation ranges 19 of the individual switches 17 (as shown in FIG. 1), in which actuation ranges 19 the switches 17a, 17b, and 17c can detect the approach of the shift lever 7 to the shift paths 15a, 15b, and 15c. The shift paths 15a, 15b, and 15c can preferably be monitored by their respective switches 17a, 17b, and 17c. The detection or actuation ranges 19 can be essentially comparatively large. The detection or actuation ranges 19 can also overlap one another, as indicated by the tolerance circles 21, as shown in FIGS. 2 and 2a.

Since the switches 17a, 17b, and 17c can identify essentially only the shift paths 15a, 15b, and 15c, the switches 17a, 17b, and 17c can have relatively large actuation tolerances. The gear reached by shift path 15a, 15b, or 15c can be identified by displacement signaling sensors 24a and 24b, in particular, shift lever contacts 23a and 23b, as shown in FIG. 1a, which shift lever contacts 23a and 23b detect the displacement of the shift lever 7 out of the neutral shift position N as a function of the direction in which shift lever 7 is moved. As shown in FIG. 1a, the displacement signals 24a and 24b, which displacement signals 24a and 24b are preferably a function of the direction of motion, are essentially generated by two shift lever contacts 23a and 23b. The shift lever contacts 23a and 23b can preferably be actuated by the shifting forces exerted manually on the shift lever 7 during shifting, and namely alternately, as a function of the direction of the displacement. An example of such shift lever contacts is described in the above-mentioned DE-A 42 37 669.

In accordance with an embodiment of the present invention, the evaluation circuit 25, as shown schematically in FIG. 1, can be, for example, a component of a clutch control system of the automatic friction clutch. As a function of the shift path signals 18a, 18b, and 18c (FIG. 1a) from the switches 17a, 17b, and 17c, which switches 17a, 17b, and 17c can identify the shift paths 15a, 15b, and 15c, and the displacement signals 24a and 24b from the shift lever contacts 23, which shift lever contacts 23a and 23b can identify the direction of displacement of the shift lever 7 in the shift pattern as illustrated in FIG. 2, the evaluation circuit 25 can supply a position signal which can essentially identify the instantaneous driving shift position of the transmission 1. For example, if the left switch 17a, as illustrated in FIG. 1a, in the neutral path essentially responds, and if the shift lever contacts 23a and 23b essentially signal forward motion in this particular shift path 15a, the evaluation circuit 25 can essentially supply a position signal, which position signal essentially indicates first gear. If, on the other hand, the shift lever contact 23b for the reverse direction in this shift path 15a essentially responds, the position signal essentially indicates second gear.

Accordingly, such signals can be entered into the evaluation circuit 25 also for the purpose of adjusting the automatic friction clutch to perform control procedures. Such a friction clutch is shown by example in FIG. 3. Such control procedures may contribute to increased vehicle safety.

During starting of a motor vehicle with an automatic friction clutch, to essentially prevent the corresponding clutch control system from starting to engage the clutch even before a starting gear, e.g. first gear (1) or reverse (R), has been essentially completely engaged, the evaluation circuit 25 can receive a control signal from an accelerator pedal sensor 31 (see FIGS. 1 and 1a). The accelerator pedal sensor 31 preferably monitors the position of the accelerator pedal 29 of the motor vehicle. The accelerator pedal sensor 31 can sense the displacement 32 (FIG. 1a) of the accelerator pedal 29, from the idle position of the accelerator pedal 29, during idling of the internal combustion engine, and the accelerator pedal sensor 31 can generally also initiate the engagement process of the friction clutch by the clutch control system. In this manner, the driver can generally make certain that the clutch engagement process essentially only begins when the starting gear has been completely engaged.

The evaluation circuit 25 can preferably have an output 27. Along with the output 27 and the position signal, which position signal can be emitted by the evaluation circuit 25 when the accelerator pedal 29 moves out of the idle position, the evaluation circuit 25 can also deliver the information to the downstream circuits, e.g. to the clutch control system, that the starting gear has been essentially completely engaged. This information can be a component of the position signal, but it can also be made available as a separate signal. In addition, the evaluation circuit 25 can respond to a speed sensor 33, which speed sensor 33 can measure the speed of rotation 34 (shown in FIG. 1a) of the output shaft 5, i.e. a parameter which is essentially proportional to the speed of travel of the motor vehicle. The evaluation circuit 25 can supply the position signal, which position signal essentially identifies the starting gear preferably only when the speed sensor 33 determines that the vehicle is essentially stationary.

The above-mentioned information indicating that the driving shift position has been completely reached can essentially be determined when gears are shifted during travel by a comparison of the ratio of the speed of rotation 34 of the output shaft 5 to the speed of rotation 36 (shown in FIG. 1a) of the input shaft 3 to the transmission ratio specified by the transmission design for the desired driving shift position.

For this purpose, preferably not only is the speed of rotation 34 of the output shaft 5 measured by the speed sensor 33, but the speed of rotation 36 of the input shaft 3 is also preferably measured by a speed sensor 35. As long as the shift lever 7, during the shifting of gears, is essentially located in the neutral path 13 (FIGS. 2 and 2a) and the friction clutch is open or disengaged, the input shaft 3 can essentially come to a stop, while the output shaft 5 rotates at a speed which is generally determined by the speed of travel. After the gear has been shifted, when the new driving shift position is selected on the transmission 1, the input shaft 3 can rotate at the speed determined by the transmission ratio of this driving shift position. The evaluation circuit 25 can supply the information indicating when the driving shift position has been completely engaged essentially as soon as the measured speed ratio is essentially equal to the specified transmission ratio of the gear identified by the switch 17a, 17b, or 17c and the shift lever contacts 23a and 23b. This information can also be a component of the position signal, which position signal can identify the gear, or, alternatively, this information can be supplied as an additional signal.

The disclosure now turns to an example of a clutch assembly having components which may be utilized in accordance with the preferred embodiments of the present invention, with reference to FIGS. 1–2a. It should be understood that components disclosed hereinbelow, with relation to FIGS. 3 and 4 may, if appropriate, be considered to be interchangeable with similar components discussed hereinabove with relation to FIGS. 1–2a.

The flywheel apparatus illustrated in FIG. 3 includes a first centrifugal mass 201. In the radially outer area, the first centrifugal mass 201 can support a starter rim 202. The radially inner area of the centrifugal mass 201 can be provided with passages which can preferably be aligned with similar passages in a hub disc 203 and a sleeve 204. The counterpressure-free end of sleeve 204 can preferably support a bearing element 205. The centrifugal mass 201, the hub disc 203 and the sleeve 204 can be firmly connected to one another by rivets 207 which can penetrate some of the passages, and also by screws 208 which can penetrate some of the passages. The centrifugal mass 201, the hub disc 203 and the sleeve 204 can be connected to a driving mechanism, e.g. the crankshaft of an internal combustion engine.

In accordance with an embodiment of the present invention, for the purpose of fastening the rivets 207 and the screws 208, there are preferably openings in the clutch plate 235. The openings in the clutch plate 235 can preferably be located axially adjacent the area where the rivet 207 or the screw 208 can essentially be inserted to fasten the first centrifugal mass 201, the hub disc 203 and the sleeve 204 together. By inserting a tool through the opening in the clutch plate 235, the head of the rivet 207 or of the screw 208 can then be tightened.

The hub disc 203 can preferably be engaged in the radially outer area with spring elements 209, to which spring elements 209 pressure can also be applied by projections 210. The projections 210 can preferably be fastened to cover plates 211 and 212 by rivets 213. The cover plates 211, 212 can preferably be firmly connected to one another radially outside the hub disc 203 by welding. On its radially inner end, the cover plate 211 is preferably engaged with a basic friction device 214, which friction device 214 can interact in the manner which is well-known in the art with regard to an application spring 215. And the cover plate 212, on its radially inner end, in interaction with the corresponding projection 210, can axially secure the bearing element 205, the inner bearing ring of which bearing element 205 is in turn supported on the hub disc 203 by a bushing 216. The spring elements 209, like the basic friction device 214, can preferably be part of a torsional vibration damper 218. The torsional vibration damper 218 is preferably enclosed by the cover plates 211 and 212 and can preferably be filled with viscous medium to damp movements of the spring elements 209.

The cover plates 211 and 212 preferably move relative to the hub disc 203. The cover plates 211, 212 are preferably active as the second centrifugal mass 220 of the flywheel apparatus. The cover plate 211 preferably projects in the radial direction beyond the point where the cover plate 211 is welded to the cover plate 212 radially outward. Close inside the outer end of the cover plate 211, there can preferably be a recess 221, which recess 221 essentially permits the insertion of a fastening means 222, e.g. a screw 223. Aligned with the recess 221, there can preferably be openings 225 in the first centrifugal mass 201. Also preferably aligned with the recess 221, there can be a depression 228, e.g. in the form of a blind hole 229, that can be located in a counterpressure plate 230.

If a screw 223 is to be inserted as the fastening element 222 the depression 228 can preferably be cylindrical and can be provided with a thread.

Therefore, in accordance with a preferred embodiment of the present invention, the cover plates 211, 212 can be designed to move with respect to the hub disc 203. In addition, the cover plates 211, 212 can be designed to essentially act as the second centrifugal mass 220. For the purpose of operatively connecting the cover plates 211, 212 to the the counterpressure plate 230, the cover plate can preferably extend radially outward beyond the point where the cover plate 211 is welded to cover plate 212. For the purpose of fastening the cover plate 211 to the counterpressure plate 230, the recesses 221 in the radially extended portion of the cover plate 211 can preferably be aligned with passages in the clutch housing 227 and with the depressions 228 of the counterpressure plate 230. The recesses 221 can also preferably be aligned with the openings 225 of the first centrifugal mass 201. When the recesses 221, depressions 228, and the openings 225 are essentially in alignment with one another, the fastening elements 222 can then be inserted therethrough thereby fastening the cover plate 211 with respect to the counterpressure plate 230.

The clutch housing 227 preferably has a ring-shaped wall 232, which ring-shaped wall 232 preferably surrounds the counterpressure plate 230. On the side facing the centrifugal masses 201 and 220, the wall 232 can preferably have an extension 233, which extension 233 can preferably be bent radially inward.

Figure 4:
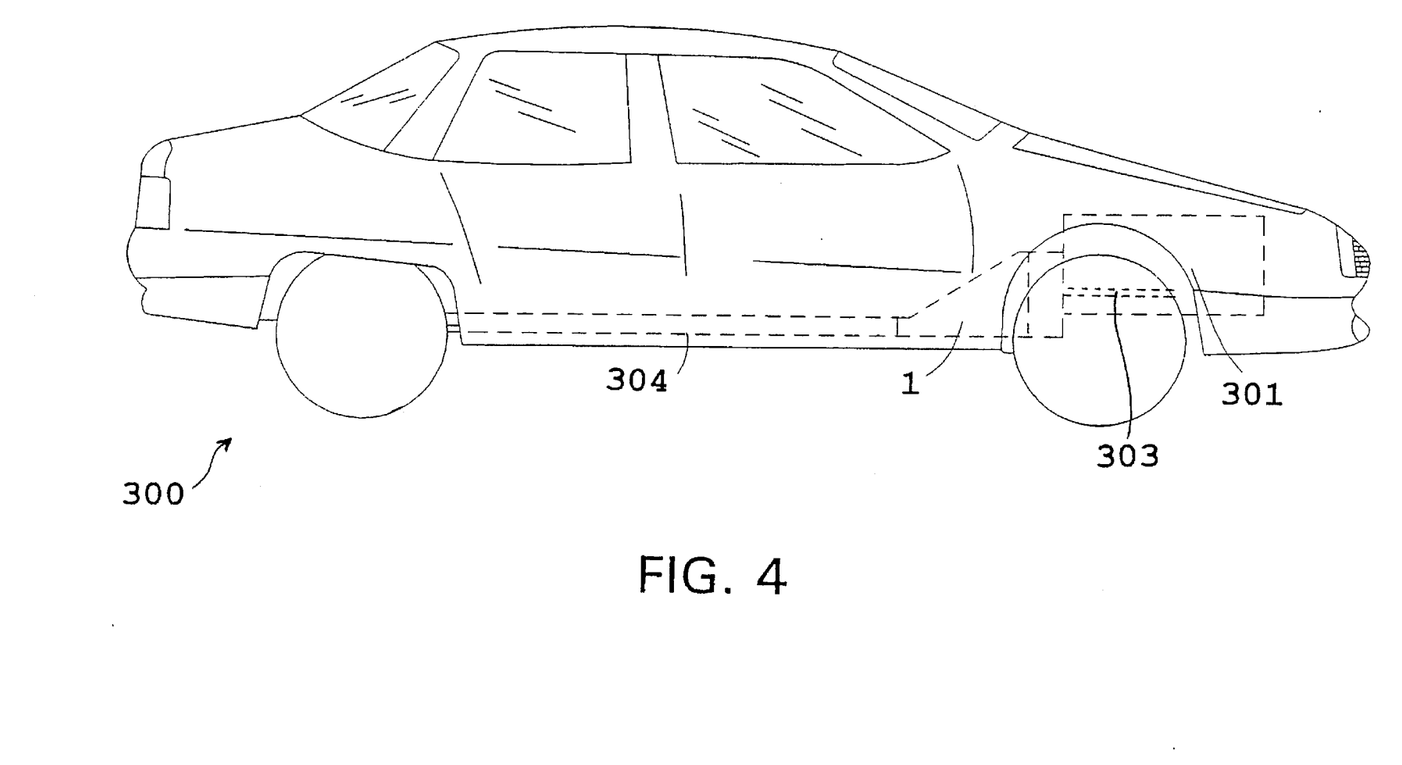
FIG. 4 shows a motor vehicle and components related to the present invention.

FIG. 4 shows what could be considered to be a typical automobile 300, which automobile 300 can include an internal combustion engine 301, which can be mounted in a forward portion of the automobile 300. The combustion engine 301 can have a crankshaft 303 for outputting mechanical rotary power generated by the engine 301. The automobile 300 could also typically include a transmission 1 in accordance with the present invention for transmitting mechanical power from the crankshaft 303 of the engine 301 to the wheels, via drive shaft 304. The automobile has a manual transmission 1, as shown in FIG. 1, which transmission 1 can be engaged with the engine 301.

One feature of the invention resides broadly in the flywheel apparatus, consisting of a first centrifugal mass connected to a drive and a second centrifugal mass connected to the first centrifugal mass by means of a torsional vibration damper, whereby the second centrifugal mass is rotatable with respect to the first centrifugal mass and located on the second centrifugal mass is a clutch housing which has an application plate which is non-rotational but can move axially, application means which apply an application force, and a clutch plate which is located between the application plate and a counterpressure plate, characterized by the fact that the clutch housing 27 together with the counterpressure plate 30 forms a pre-fabricated unit 50 which can be fastened to the corresponding centrifugal mass 20 by means of fastening elements 22.

One feature of the invention resides broadly in the system for the detection of a shift position selected in a motor vehicle transmission, whereby the transmission 1 can be set by means of an actuator mechanism 7, in particular by means of a manually actuated shift lever, in a neutral position in which an output shaft 5 of the transmission 1 is uncoupled from its input shaft 3, and starting from the neutral shift position can be set in several shift paths 15 to one of several driving shift positions, in which the output shaft 5 is coupled to the input shaft 3 at individual transmission ratios which correspond to the driving shift positions, characterized by a sensor system 17 which, when the transmission 1 is set to the neutral shift position, delivers a path signal which identifies the shift path 15 to which the actuator mechanism 7 is set, by displacement signaling means 23 common to all the shift paths 15 which supply a displacement signal which identifies a shifting motion of the actuator mechanism 7 out of the neutral shift position, and by evaluation means 25 which supply a position signal identifying the shift position as a function of the path signal and the displacement signal.

Another feature of the invention resides broadly in the system characterized by the fact that the sensor system 17 comprises separate switches corresponding to the shift paths 15, in particular switches which operate in a contactless manner.

Yet another feature of the invention resides broadly in the system characterized by the fact that at least one of the switch paths 15 contains two driving shift positions which, starting from the neutral shift position, can be selected by shifting motions of the actuator mechanism 7 in opposite directions, that the displacement signaling means 23 supply displacement signals which identify the shifting motion toward the shift path 15, and that the evaluation means 25 supply the position signal identifying the shift position as a function of the direction of motion indicated by the displacement signal.

Still another feature of the invention resides broadly in the system characterized by the fact that the displacement signaling means 23 include at least one switch 23 which responds to actuation forces exerted manually on the shift lever to initiate a shifting motion.

A further feature of the invention resides broadly in the system characterized by the fact that there is at least one pair of switches to detect motion in opposite directions.

Another feature of the invention resides broadly in the system characterized by the fact that the evaluation means 25 supply the position signal identifying the driving shift position together with information which identifies that the driving shift position identified by the position signal has been completely reached.

Yet another feature of the invention resides broadly in the system characterized by the fact that the evaluation means 25 respond to an accelerator pedal sensor 31 which detects the displacement of the accelerator pedal 29 from its idle position, and supply the information which identifies that the driving shift position has been completely reached, when the accelerator pedal sensor 31 detects a displacement of the accelerator pedal 29 from its idle position.

Still another feature of the invention resides broadly in the system characterized by the fact that the evaluation means 25 supply the information which indicates the setting of the driving shift position is complete, if the position signal also identifies a driving shift position which makes possible the starting of the motor vehicle.

A further feature of the invention resides broadly in the system characterized by the fact that the evaluation means 25 respond to a vehicle speed sensor which measures the speed of travel of the motor vehicle, in particular in the form of a speed sensor 33 which measures the speed of rotation of the output shaft 5 of the transmission 1, and which evaluation means 25 supply information which indicates that the driving shift position has been completely set, if the vehicle speed sensor also essentially determines that the motor vehicle is stationary.

Another feature of the invention resides broadly in the system characterized by the fact that the evaluation means 25 respond to a first speed sensor 33 which measures the speed of rotation of the output shaft 5 of the transmission 1, and to a second speed sensor 35 which measures the speed of rotation of the input shaft 3 of the transmission 1, and supply the information indicating that the driving shift position has been completely reached, when the ratio of the speeds of rotation of the input shaft 3 and the output shaft 5 are essentially equal to the transmission ratio of the driving shift position as indicated by the position signal.

Some examples of transmissions in which the present invention may be incorporated may be disclosed by the following U.S. Pat. No. 5,199,316 to Hoffman, entitled "Fully-Synchronized Multiple Speed Manual Transmission for Motor Vehicles"; U.S. Pat. No. 4,458,551 to Winter, entitled "Manual Transmission"; and U.S. Pat. No. 3,858,460 to Porter et al., entitled "Four Speed Manual Transmission and Control".

Some examples of clutch assemblies and various components associated therewith which could possibly utilize the present invention may be disclosed in the following U.S. Patents: U.S. Pat. No. 5,314,051 entitled "Friction Clutch for a Motor Vehicle, and an Elastic Diaphragm for Such a Clutch" to Valeo; U.S. Pat. No. 5,333,713 entitled "Friction Clutch" to Valeo; U.S. Pat. No. 4,684,007 to Maucher, entitled "Clutch Plate"; U.S. Pat. No. 4,635,780 to Wiggen, entitled "Clutch Disc for a Motor Vehicle Friction Clutch"; U.S. Pat. No. 4,651,857 to Schraut et al., entitled "Clutch Disc Unit for a Motor Vehicle Friction Clutch"; U.S. Pat. No. 5,103,688 to Kuhne, entitled "Two-mass Flywheel"; and U.S. Pat. No. 4,777,843 to Bopp, entitled "Two-mass Flywheel Assembly With Viscous Damping Assembly".

Some examples of sensors which may be utilized in accordance with the present invention may be or are disclosed in the following U.S. Patents: U.S. Pat. No. 5,341,295 entitled "Vehicle Transmission Shift Control Apparatus Having Means for Suitably Determining Compensating Coefficient Used in Determining Shifting of the Transmission" to Toyota; U.S. Pat. No. 5,365,768 entitled "Sensor" to Hitachi; U.S. Pat. No. 5,197,326 entitled "Arrangement for Monitoring Rotational Speed Sensor" to Bosch; U.S. Pat. No. 5,337,866 entitled "Device for Monitoring a Friction Clutch" to Fichtel & Sachs; U.S. Pat. No. 5,239,263 entitled "Magnetic Rotation Sensor for Rotary Shaft"; U.S. Pat. No. 5,309,094 entitled "Bearing Rotary Speed Sensor with Concentric Multipole Magnetic Rings Axially aligned with Collector Branches"; and U.S. Pat. No. 5,192,877 entitled "Hall Effect Sensor and Component Providing Differential Detection".

Examples of sensors and related components for friction clutches which may be utilized in accordance with the present invention may be found in the following U.S. Patents: U.S. Pat. No. 5,293,316 entitled "Closed Loop Launch and Creep Control for Automatic Clutch" to Eaton Corporation; U.S. Pat. No. 5,314,050 entitled "Clutch Mode Control Logic" to Eaton Corporation; U.S. Pat. No. 5,322,150 entitled "Arrangement for Controlling the Slip of an Automatic Friction Clutch" to Fichtel & Sachs; U.S. Pat. No. 5,332,074 entitled "Incipient Clutch Control System" to Eaton Corporation; U.S. Pat. No. 5,231,254 entitled "Automobile Transmission Mode Sensing Apparatus" to Texas Instruments; U.S. Pat. No. 5,187,977 entitled "Device for Recognition of Driving on a Grade" to WABCO; and U.S. Pat. No. 5,267,635 entitled "Clutch Actuator System" to Automotive Products.

Some examples of computer or electronic systems which may be utilized in accordance with the present invention may be found in the following U.S. documents: U.S. Pat. No. 5,363,027 entitled "Apparatus and Method of Controlling the Robotic Driving of a Vehicle" to Horiba; U.S. Pat. No. 5,325,082 entitled "Comprehensive Vehicle Information Storage System" to Rodriguez; U.S. Pat. No. 5,253,272 entitled "Digital Data Transmission System with Adaptive Predistortion of Tranmsitted Pulses" to AMP Incorporated; and U.S. Pat. No. 5,299,200 entitled "Adaptive Interface that Automatically Adjusts for Timing Skews Caused by Signal Delays" to Sharp.

Some examples of shift mechanisms which may be utilized in accordance with the present invention may be found in the following U.S. Patents: U.S. Pat. No. 5,179,870 entitled "Shift Control Lever Assembly" to Chrysler; U.S. Pat. No. 5,196,663 entitled "Transmission Control Apparatus for Automotive Vehicle" to Nissan; U.S. Pat. No. 5,243,871 entitled "Control Lever Apparatus for Generating Electrical Control Signals" to Ford New Bolland; and U.S. Pat. No. 5,321,993 entitled "Transmission Shift Control Apparatus" to Chrysler.

Examples of acceleration sensor arrangements, which may be utilized in accordance with the embodiments of the present invention, may be found in the following U.S. Patents: U.S. Pat. No. 4,898,033, which issued to Yamamoto on Dec. 6, 1990; No. 4,903,982, which issued to Harara et al. on Feb. 27, 1990; No. 4,927,170, which issued to Wada on May 22, 1990; No. 4,930,082, which issued to Harara et al. on May 29, 1990; and No. 4,948,164, which issued to Hano et al. on Aug. 14, 1990.

Examples of bandpass filters, which may be utilized in accordance with the embodiments of the present invention, may be found in the following U.S. Patents: U.S. Pat. No. 5,019,792, which issued to DiBiase et al. on May 28, 1991; No. 5,028,894, which issued to Speake on Jul. 2, 1991; No. 5,065,453, which issued to Thomas on Nov. 12, 1991; and No. 5,101,182, which issued to Babbitt et al. on Mar. 31, 1992.

Examples of lowpass filters, which may be utilized in accordance with the embodiments of the present invention, may be found in the following U.S. Patents: U.S. Pat. No. 5,023,579, which issued to Bentivenga and Bentivenga on Jun. 11, 1991; No. 5,032,909, which issued to Sato et al. on Jul. 16, 1991; No. 5,119,321, which issued to Burton et al. on Jun. 2, 1992; and No. 5,155,743, which issued to Jacobs on Oct. 13, 1992.

Examples of hysteresis arrangements, which may be utilized in accordance with the embodiments of the present invention, may be found in the following U.S. Patents: U.S. Pat. No. 4,903,813, which issued to Maki on Feb. 27, 1990; No. 4,932,921, which issued to Kobayashi et al. on Jun. 12, 1990; No. 5,065,462, which issued to Kagiyama et al. on Nov. 19, 1991; No. 4,947,706, which issued to Umeyama et al. on Aug. 14, 1990; No. 5,103,396, which issued to Hiwatashi et al. on Apr. 7, 1992; No. 4,965,475, which issued to Kautz on Oct. 23, 1990.

Examples of proportional valve arrangements, which may be utilized in accordance with the embodiments of the present invention, may be found in the following U.S. Patents: U.S. Pat. No. 4,948,165, which issued to Takahashi et al. on Aug. 14, 1990; No. 5,042,832, which issued to Takahashi et al. on Aug. 27, 1991; No. 4,991,491, which issued to Neumann on Feb. 12, 1991.

Examples of lookup table arrangements and related arrangements, which may be utilized in accordance with the embodiments of the present invention, may be found in the following U.S. Patents: U.S. Pat. No. 4,893,234, which issued to Davidson et al. on Jan. 9, 1990; No. 4,920,496, which issued to Szczebak, Jr., on Apr. 24, 1990; No. 4,968,985, which issued to Riggle et al. on Nov. 6, 1990; No. 4,974,078, which issued to Tsai on Nov. 27, 1990.

General examples of components, relating to apparatus for the control of vibration dampers, which may be utilized in accordance with the embodiments of the present invention, may be found in the following U.S. Patents: U.S. Pat. No. 4,872,701, which issued to Akatsu et al. in October 1989; No. 4,869,528 to Buma et al., which issued to Buma et al. in September 1989; No. 4,865,347, which issued to Fukushima et al. in September 1989; No. 4,853,860, which issued to Achenbach in August 1989; No. 4,827,416, which issued to Kawagoe et al. in May 1989; No. 4,765,648, which issued to Mander et al. in August 1988; No. 4,669,749, which issued to Tanaka et al. in June 1987; and No. 4,664,409, which issued to Nakashima et al. in May 1987.

Some examples of systems in which embodiments of the present invention would be used are: U.S. Pat. No. 5,228,719, entitled "Automotive Active Suspension System for Anti-Rolling Control"; U.S. Pat. No. 5,231,583 to Lizell, entitled "Method and Apparatus for Dynamic Leveling of a Vehicle Using an Active Suspension System"; U.S. Pat. No. 5,195,772 to Bachrach, Levitt, and Nametz, entitled "Valve Configuration for Converting an Active Suspension System Into a Passive Suspension System"; U.S. Pat. No. 5,183,127 entitled "Suspension-Traction Total Control System"; U.S. Pat. No. 5,208,749 entitled "Method for Controlling Active Suspension System on the Basis of Rotational Motion Model"; U.S. Pat. No. 5,299,488 to Kadlicko and Halina, entitled "Active Suspension System"; U.S. Pat. No. 5,322,319 entitled "Active Suspension Apparatus for a Vehicle"; U.S. Pat. No. 5,322,321 to Yopp, entitled "Vehicle Active Suspension System"; and U.S. Pat. No. 4,700,812 entitled "Vehicular Suspension System," issued to Moser.

Some types of automobile suspension systems that could be utilized in accordance with a rotary actuator motor may be or are disclosed by the following U.S. Patents: U.S. Pat. No. 5,178,406 to Reynolds, entitled "Torsion Bar Suspension"; U.S. Pat. No. 5,286,059 to Tabe, entitled "Height Control System when Vehicle Is Jacked Up"; U.S. Pat. No. 5,288,101 to Minnett, entitled "Variable Rate Torsion Control System for Vehicle Suspension"; and U.S. Pat. No. 5,290,048 to Takahashi and Yamashita, entitled "Working Fluid Circuit for Active Suspension Control System of Vehicle".

Some other examples of systems that could be used in conjunction with the present invention may be or are disclosed by the following U.S. Patents: U.S. Pat. No. 5,251,728 to Mund et al., entitled "Hydraulic Vibration Damper or Shock Absorber with Electrical Connector Therefor"; U.S. Pat. No. 4,785,920 to Knecht et al., entitled "Hydraulic Adjustable Shock Absorber"; U.S. Pat. No. 4,719,800 to Moser, entitled "Accelerometer"; U.S. Pat. No. 4,989,148 to Gürke et al., entitled "Apparatus for the Computer-Assisted Control of Vibration Dampers of a Vehicular Suspension System as a Function of the Roadway"; U.S. Pat. No. 4,749,070 to Moser et al., entitled "Hydraulic Vibration Damper Having Adjustable Damping Valve".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. P 44 27 330.4, filed on Aug. 2, 1994, having inventor Erich Friedrich, and DE-OS P 44 27 330.4 and DE-PS P 44 27 330.4, are hereby incorporated by reference as if set forth in their entirety herein.

Examples of systems for detecting positions and signals of components of a motor vehicle which may be utilized in accordance with embodiments of the present invention, may be found in commonly assigned and copending U.S. patent application Ser. No. 08/430,566, as well as Federal Republic of Germany Patent Application No. P 44 15 155 corresponding thereto.

The invention as described hereinabove in the context of the preferred embodiments is not to be taken as limited to all of the provided details thereof, since modifications and variations thereof may be made without departing from the spirit and scope of the invention.

What is claimed is:

1. Transmission system for the detection of a shift position selected in a motor vehicle transmission, the transmission system comprising:

a shift lever arrangement;

said shift lever arrangement comprising a manually actuated shift lever;

said shift lever arrangement comprising means for being in a neutral position, in which neutral position an output shaft of the transmission is uncoupled from an input shaft of the transmission;

said shift lever arrangement comprising means for being positioned in a plurality of shift paths upon being in the neutral position;

said shift lever arrangement comprising means for being shiftable from the neutral position to at least one of a plurality of driving shift positions, in which driving shift positions the output shaft is coupled to the input shaft at individual transmission ratios, which individual transmission ratios correspond to the driving shift positions;

a sensor system;

said sensor system comprising means for transmitting a path signal corresponding to one of said plurality of shift paths in which said shift lever is positioned;

means for transmitting a displacement signal corresponding to a shifting motion of said shift lever out of the neutral position;

said displacement signal transmitting means comprising means for being common to all of said plurality of shift paths;

evaluation means for supplying a position signal identifying the shift position as a function of the path signal and the displacement signal;

said path signal transmitting means comprising separate switches corresponding to each of said plurality of shift paths;

said separate switches comprising means for operating in a contactless manner;

at least one of said plurality of shift paths comprising a first driving shift position and a second driving shift position;

said means for being shiftable from the neutral position to at least one of a plurality of driving shift positions comprising means for being shiftable in a first direction into the first driving shift position and means for being shiftable in a second direction into the second driving shift position, the first direction being substantially opposite to the second direction;

said displacement signal transmitting means comprising means for transmitting a signal corresponding to the direction of the driving shift position;

said evaluation means for transmitting a position signal comprising means for transmitting a shift position signal as a function of the direction of the driving shift position indicated by the displacement signal;

said means for transmitting a signal corresponding to the direction of the driving shift position comprising at least one switch which responds to actuation forces exerted manually on said shift lever to initiate a shifting motion;

said at least one switch which responds to actuation forces comprising at least one pair of switches;

said at least one pair of switches comprising means for detecting motion in opposite directions;

said evaluation means for transmitting a position signal comprising means for transmitting a signal identifying that the driving shift position identified by the position signal has been completely reached;

means for transmitting a signal to the evaluation means indicating that a driving shift position has been completely reached;

said means for transmitting a signal to the evaluation means indicating that a driving shift position has been completely reached comprising an accelerator pedal sensor;

said accelerator pedal sensor comprising means for detecting the displacement of the accelerator pedal out of a position corresponding to the idling of motor means; and said means for transmitting a signal identifying that the driving shift position has been completely reached comprising means for transmitting the signal that the driving shift position has been completely reached upon the accelerator pedal sensor detecting a displacement of the accelerator pedal out of the idling position.

2. The transmission system according to claim 1, wherein said means for transmitting a signal identifying that the driving shift position has been completely reached comprises means for transmitting the signal that the driving shift position has been completely reached upon the displacement signal identifying a driving shift position which makes possible the starting of the motor vehicle.

3. The transmission system according to claim 2, wherein:

said transmission system comprises a vehicle speed sensor;

said vehicle speed sensor comprises means for measuring the speed of travel of the motor vehicle;

said means for measuring the speed of travel of the motor vehicle comprises means for measuring the speed of rotation of the output shaft of the transmission;

said vehicle speed sensor comprises means for transmitting a signal, corresponding to a measured output shaft speed of rotation, to said evaluation means; and said means for transmitting a signal identifying that the driving shift position has been completely reached comprising means for transmitting the signal that the driving shift position has been completely reached upon said vehicle speed sensor measuring that the motor vehicle is stationary.

4. The transmission system according to claim 3, wherein:

said transmission system comprises a second speed sensor;

said second speed sensor comprises means for measuring a speed of rotation of an input shaft of the transmission;

said second speed sensor comprises means for transmitting a signal corresponding to a speed of rotation of an input shaft of the transmission;

said means for transmitting a signal identifying that the driving shift position has been completely reached comprising means for transmitting the signal that the driving shift position has been completely reached upon a ratio of the speeds of rotation of the input shaft and the output shaft being essentially equal to a corresponding transmission ratio of the driving shift position as indicated by the position signal.

5. System for the detection of a shift position selected in a motor vehicle transmission; the transmission comprising a shift lever arrangement; said shift lever arrangement comprising a manually actuated shift lever; said shift lever arrangement comprising means for being in a neutral position, in which neutral position an output shaft of the transmission is uncoupled from an input shaft of the transmission; said shift lever arrangement comprising means for being positioned in a plurality of shift paths upon being in the neutral position; said shift lever arrangement comprising means for being shiftable from the neutral position to at least one of a plurality of driving shift positions, in which driving shift positions the output shaft is coupled to the input shaft at individual transmission ratios, which individual transmission ratios correspond to the driving shift positions; at least one of said plurality of shift paths comprising a first driving shift position and a second driving shift position; said means for being shiftable from the neutral position to at least one of a plurality of driving shift positions comprising means for being shiftable in a first direction into the first driving shift position and means for being shiftable in a second direction into the second driving shift position, the first direction being substantially opposite to the second direction; said system comprising:

a sensor system;

said sensor system comprising means for transmitting a path signal corresponding to one of the plurality of shift paths in which the shift lever is positioned;

means for transmitting a displacement signal corresponding to a shifting motion of the shift lever out of the neutral position;

said displacement signal transmitting means comprising means for being common to all of said plurality of shift paths;

evaluation means for supplying a position signal identifying the shift position as a function of the path signal and the displacement signal;

said path signal transmitting means comprising separate switches corresponding to each of the plurality of shift paths;

said separate switches comprising means for operating in a contactless manner;

said displacement signal transmitting means comprising means for transmitting a signal corresponding to the direction of the driving shift position;

said evaluation means for transmitting a position signal comprising means for transmitting a shift position signal as a function of the direction of the driving shift position indicated by the displacement signal;

said means for transmitting a signal corresponding to the direction of the driving shift position comprising at least one switch which responds to actuation forces exerted manually on the shift lever to initiate a shifting motion;

said at least one switch which responds to actuation forces comprising at least one pair of switches;

said at least one pair of switches comprising means for detecting motion in opposite directions;

said evaluation means for transmitting a position signal comprising means for transmitting a signal identifying that the driving shift position identified by the position signal has been completely reached;

means for transmitting a signal to the evaluation means indicating that a driving shift position has been completely reached;

said means for transmitting a signal to the evaluation means indicating that a driving shift position has been completely reached comprising an accelerator pedal sensor;

said accelerator pedal sensor comprising means for detecting the displacement of the accelerator pedal out of a position corresponding to the idling of motor means; and said means for transmitting a signal identifying that the driving shift position has been completely reached comprising means for transmitting the signal that the driving shift position has been completely reached upon the accelerator pedal sensor detecting a displacement of the accelerator pedal out of the idling position.

6. System according to claim 5, wherein said means for transmitting a signal identifying that the driving shift position has been completely reached comprises means for transmitting the signal that the driving shift position has been completely reached upon the displacement signal identifying a driving shift position which makes possible the starting of the motor vehicle.

7. System according to claim 6, wherein:

said system comprises a vehicle speed sensor;

said vehicle speed sensor comprises means for measuring the speed of travel of the motor vehicle;

said means for measuring the speed of travel of the motor vehicle comprises means for measuring the speed of rotation of the output shaft of the transmission;

said vehicle speed sensor comprises means for transmitting a signal, corresponding to a measured output shaft speed of rotation, to said evaluation means; and said means for transmitting a signal identifying that the driving shift position has been completely reached comprising means for transmitting the signal that the driving shift position has been completely reached upon said vehicle speed sensor measuring that the motor vehicle is stationary.

8. System according to claim 7, wherein:

said system comprises a second speed sensor;

said second speed sensor comprises means for measuring a speed of rotation of an input shaft of the transmission;

said second speed sensor comprises means for transmitting a signal corresponding to a speed of rotation of an input shaft of the transmission;

said means for transmitting a signal identifying that the driving shift position has been completely reached comprising means for transmitting the signal that the driving shift position has been completely reached upon a ratio of the speeds of rotation of the input shaft and the output shaft being essentially equal to a corresponding transmission ratio of the driving shift position as indicated by the position signal.

\* \* \* \* \*

UNITED STATES PATENT AND TRADEMARK OFFICE
CERTIFICATE OF CORRECTION

PATENT NO. : 5,660,079
DATED : August 26, 1997
INVENTOR(S) : Erich FRIEDRICH

It is certified that error appears in the above-identified patent and that said Letters Patent is hereby corrected as shown below:

In column 13, line 26, after 'New', delete "Bolland;" and insert --Holland;--.

Signed and Sealed this

Twenty-fifth Day of November, 1997

Attest:

BRUCE LEHMAN

Attesting Officer    Commissioner of Patents and Trademarks